May 24, 1932.  W. H. MacCOLLUM  1,859,928

WINDSHIELD THERMOMETER

Filed Aug. 28, 1930

INVENTOR
William H. MacCollum
BY
Barton A. Bean Jr.
ATTORNEY

Patented May 24, 1932

1,859,928

UNITED STATES PATENT OFFICE

WILLIAM H. MacCOLLUM, OF BUFFALO, NEW YORK

WINDSHIELD THERMOMETER

Application filed August 28, 1930. Serial No. 478,440.

This invention relates to a thermometer mountable on exterior glass portions of motor vehicle windows and windshields as well as the windows of dwellings and office buildings.

An object of this invention is to economize in labor and material by providing a resilient and monolithic thermometer housing body which may be cast in rubber or the like. The use of this material affords a simple and effective attaching means for the thermometer panel which entirely eliminates the use of tools in the assembly operation. The entire device is mounted on a windshield by means of suction cups which are also mounted in the body portion by a toolless connection member.

A further feature of this invention resides in providing a peculiar reinforcement for the shell-like resilient body and utilizing the same on the outwardly exposed side of the body portion as an advertising device for any suitable article, particularly automobile tires. In the latter use, the body is molded to approximate the appearance of a tire having characteristic tread designs.

Further objects and advantages of the present invention are described in detail in the ensuing specification and drawings.

Figure 1:
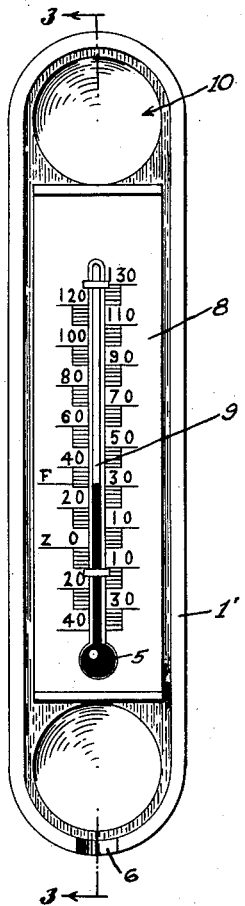
Fig. 1 is a front elevation of the assembled device.

The body portion or housing of the windshield thermometer is indicated at 1 and is preferably an elongated hollow member having parallel sides and rounded ends. It will be understood that the body portion is not necessarily limited to the shape and proportion of the form described. The body portion is recessed, and the wall portion 1', surrounding such recess, forms a skirt to seat on the windshield glass. Within the recess and spaced from the ends of the body portion is a raised flat thermometer supporting pad 2 and is provided at its lower and upper extremities with integral securing means or mounting gibs 3, which extend the width of the pad and are slightly raised therefrom. Immediately adjacent each end of the pad is provided an upwardly extending circular boss 4 which is recessed at 5. Both the bosses and the pad are preferably below the level of the marginal portion 1 and contained entirely within the recess. A ventilating orifice 6 is provided at one end of the body portion and extends through the surface 1'.

Figure 4:
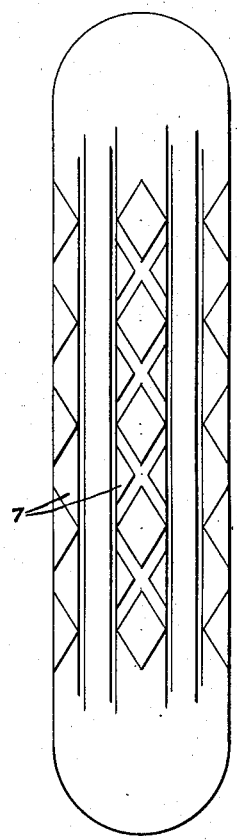
Fig. 4 is a rear elevation.

The body member described is preferably a casting of rubber or like resilient material and such casting includes all the parts above described, and in addition, on the back surface which is semi-cylindrical in form, characteristic advertising designs are also cast. As shown in Fig. 4, this may preferably take the form or simulate a model tire, having characteristic tread portions 7 which are a facsimile in shape and contour of any of the well known and well advertised treads. Such tread portions in addition to their advertising feature are found to properly reinforce the structure to permit flexing thereof as hereinafter described.

Figure 3:
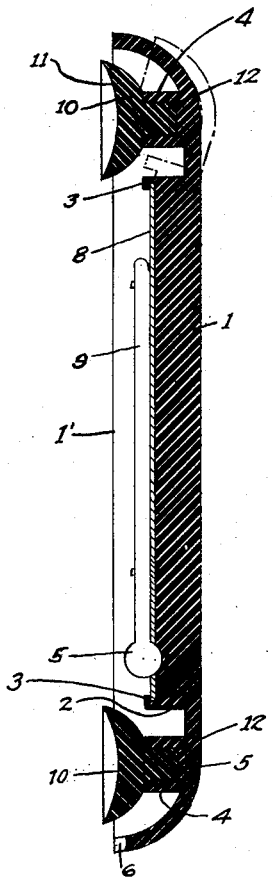
Fig. 3 is a section on the line 3—3 of Fig. 1.

The thermometer unit, which is housed within the body portion, comprises a thin panel 8 which is suitably calibrated and carries a thermometer of the well known bulb design which is indicated at 9. The panel is rectangular in shape and is slightly longer than the distance between the gibs 3 of the pad 2. The thermometer unit is easily mounted within the body by inserting one end on one gib and then by flexing one end of the body outwardly as shown in dotted lines (Fig. 3) so that the distance between the gibs is naturally slightly increased, and by rolling the body thus flexed upon the panel so that the remaining end thereof will engage into the soft rubber of the remaining gib and be thus resiliently retained.

The recessed bosses 4 are utilized to mount the fastening means for the entire unit. Such fastening means are preferably rubber suction cups indicated as 10, and are substantially semi-hemispherical in form and provided with a concave suction surface 11. One end of the suction cup is provided with an integral cylindrical lug 12 which is adapted to fit tightly in the recess 5 of the boss 4 with the suction surface within the line of the surface 1'. In assembling the suction cup with the body portion, the lug 12 is forced into the recess 5 by slightly flexing one of the walls of the boss to permit exit of air therefrom. When the lug has entered entirely into the boss, such flexure is released, and the assembly therebetween is practically permanent since any effort to pull the cup from the boss will be resisted by the natural affinity of the flexible materials and also by suction which would be thus produced.

Figure 2:
Fig. 2 is a view showing the device attached to the outside of a windshield.

The unit described may be easily applied to any of the glass portions of an automobile such as side windows or the windshield 13, (the latter adaption being shown in Fig. 2) by simply pressing the portion of the body above the suction cups so that a suction is formed therein to thereby resiliently hold the margin 1' on the windshield in constant contact. When thus mounted, the thermometer which is within the body portion is thus adequately housed and protected from snow or ice. Sufficient air circulation is permitted for proper registering operation of the thermometer through the orifice 6 in the marginal portion 1'.

Any other type of connection between the windshield and the device may be used and attached to the body portion in the same manner as the suction cup heretofore described.

From the foregoing it will be apparent that the device described is not necessarily limited to the construction shown and is therefore limited in scope only by the terms of the claims. The term "motor vehicle thermometer" is used in the claims broadly to include windows or transparencies in buildings, cabins and other structures having glazed openings wherein the temperature at one side may be read through the window.

I claim:

1. A motor vehicle thermometer comprising a recessed body portion of resilient material, a temperature registering member within the recess of said body portion, securing means integral with said body portion for resiliently engaging and mounting said member, and means for attaching said body portion in spaced relation to the windshield of an automobile.

2. A motor vehicle thermometer, comprising a body portion having a wall portion enclosing a recess therein, a thermometer unit, securing means integral with and within said body portion, said securing means removably retaining said thermometer in said body portion, and means for attaching said body portion to an automobile windshield surface with said wall portion retained in resilient contact thereon.

3. A motor vehicle thermometer, comprising a recessed body portion of resilient material, an integral raised pad within said body portion and raised connection members on marginal portions of said pad, said thermometer unit being mounted on said pad by flexing said body member to resiliently engage said connection members with said thermometer unit.

4. A window thermometer, comprising a resilient shell opened at one side for having marginal contact with a supporting transparency, means within the shell for attaching the same to the transparency, and a thermometer arranged within the shell and facing the open side thereof.

5. A window thermometer mount, comprising a resilient shell opened at one side for having marginal contact with a supporting transparency, means within the shell for attaching the same to the transparency, said shell having on its exterior surface projecting portions serving to hold the back of the shell against undue flexing and arranged thereon to create a design in accord with the body lines of the shell.

6. A motor vehicle thermometer, comprising a recessed body member having a rounded shell and a wall portion surrounding said recess, a thermometer mounted within said body member, tread portions on the exterior of said body member, said tread portions simulating a tire tread and also reinforcing said body member, and means for mounting said body member on a windshield to engage said wall portion therewith.

7. A motor vehicle thermometer, comprising a body portion having a wall portion enclosing a recess therein, a thermometer unit, securing means within said recess and integral with said body portion, said securing means removably retaining said thermometer in said body portion, means for attaching said recessed portion to an automobile windshield surface with said wall portion retained in resilient contact thereon, and said body portion having ventilating means connecting the interior of the mounted body member with the outside air.

8. A motor vehicle thermometer, comprising a body member having an orifice and a wall portion enclosing an open recess therein, a thermometer unit, securing means for mounting said unit within the recess of said body member, a pair of spaced recessed bosses within said recess and integral with said body member, suction cups each having a portion resiliently engaging its respective boss, the suction surface of said suction cups being partially within the recess of said body member, said suction cups being engageable with a windshield surface whereby said wall portion is resiliently maintained in contact with said windshield surface.

9. A motor vehicle accessory comprising a supporting body having a thermometer supporting pad, a thermometer supported on said pad, means for attaching the supporting body to a windshield, and a protecting skirt carried by the body portion and enclosing the thermometer and said attaching means, said skirt being designed for seating on a windshield glass to protect the thermometer against any wind passing thereover, said skirt having a passage providing communication between the outside atmosphere and the thermometer whereby comparatively calm air conditions will exist about the thermometer for affecting more perfect registration of the actual temperature, said thermometer being adapted for mounting on the exterior side of a windshield of a motor vehicle and being readable from within the automobile through the windshield glass.

10. A motor vehicle accessory for indicating the outdoor temperature, comprising a recessed supporting body, a thermometer carried by the body within the recess thereof, a protecting skirt carried by the body for sealing contact between said body and the exterior surface of a windshield glass whereby the thermometer may be read from within the motor vehicle through the windshield glass, said body being provided with means for establishing communication between the thermometer within the recess of the body and the exterior atmosphere, and means for attaching the supporting body to a windshield.

11. A motor vehicle accessory comprising a thermometer, a supporting body therefor having a protecting skirt about the thermometer for supporting the thermometer on the exterior surface of a windshield in spaced relation to the windshield glass, said skirt sealing the contact with the glass against the passage of air currents into the space occupied by the thermometer, said skirt having a single passage providing communication between the space and the exterior atmosphere, and means for attaching the supporting body to the glass, said means including a suction cup.

12. An elongated supporting body having a pad, a thermometer mounted on the pad and extending lengthwise of the body, and a suction cup carried by the body adjacent each end of the pad for attaching the supporting body to a transparency, said suction cups supporting the thermometer in spaced relation to the transparency whereby the thermometer will be out of direct contact with the transparency and thereby uninfluenced by the temperature thereof.

WILLIAM H. MacCOLLUM.